US011896923B2

(12) United States Patent
Lindfors et al.

(10) Patent No.: US 11,896,923 B2
(45) Date of Patent: Feb. 13, 2024

(54) AIR FILTER HOUSING FOR AN AIR FILTER ARRANGEMENT IN A VEHICLE

(71) Applicant: Volvo Truck Corporation, Gothenburg (SE)

(72) Inventors: Fredrik Lindfors, Gothenburg (SE); Hans Rönnings, Gothenburg (SE); Leo Ekbom, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 526 days.

(21) Appl. No.: 17/275,129

(22) PCT Filed: Sep. 11, 2018

(86) PCT No.: PCT/EP2018/074465
§ 371 (c)(1),
(2) Date: Mar. 10, 2021

(87) PCT Pub. No.: WO2020/052739
PCT Pub. Date: Mar. 19, 2020

(65) Prior Publication Data
US 2022/0032220 A1   Feb. 3, 2022

(51) Int. Cl.
*B01D 46/00* (2022.01)
*B01D 46/24* (2006.01)
*B01D 46/88* (2022.01)

(52) U.S. Cl.
CPC ..... *B01D 46/0005* (2013.01); *B01D 46/0004* (2013.01); *B01D 46/2411* (2013.01);
(Continued)

(58) Field of Classification Search
CPC ............ B01D 46/0004; B01D 46/0005; B01D 46/2411; B01D 46/88; B01D 2265/06;
(Continued)

(56) References Cited

U.S. PATENT DOCUMENTS 2,145,049 A * 1/1939 Heuberger ................ A47L 7/04
 55/467
2,928,495 A * 3/1960 Sweet .................... B01D 46/30
 55/474

(Continued)

FOREIGN PATENT DOCUMENTS

CN 205841047 U 12/2016
DE 3941321 A1 6/1991
(Continued)

OTHER PUBLICATIONS

International Search Report and Written Opinion for PCT/EP2018/074465 dated May 14, 2019, 13 pages.
(Continued)

*Primary Examiner* — Frank M Lawrence, Jr.
(74) *Attorney, Agent, or Firm* — Withrow & Terranova, PLLC (57) ABSTRACT

An air filter housing (200) for an air filter arrangement in a vehicle, the air filter housing being configured for receiving unfiltered air and outputting filtered air by passage of the air through an air filter unit (100). The air filter housing (200) forms a filter cavity (201) configured to house said air filter unit (100), and the air filter housing (200) comprises support member (300) being fixedly arranged in the filter cavity (201). The support member (300) comprises a filter holder portion (301) for holding said air filter unit (100) in a use position, in which use position the complete filter holder portion (301) is located inside said filter cavity (201).

15 Claims, 6 Drawing Sheets

(52) U.S. Cl.
CPC .......... *B01D 46/88* (2022.01); *B01D 2265/06* (2013.01); *B01D 2271/02* (2013.01); *B01D 2273/14* (2013.01); *B01D 2279/60* (2013.01)

(58) Field of Classification Search
CPC ............ B01D 2271/02; B01D 2273/14; B01D 2279/60
USPC ........................ 55/385.3, 422, 490, 498, 502
See application file for complete search history.

(56) References Cited

U.S. PATENT DOCUMENTS

| | | | |
|---|---|---|---|
| 3,870,489 A | | 3/1975 | Shaddock |
| 4,370,153 A | * | 1/1983 | Russell .............. B01D 46/4227 55/304 |
| 5,674,303 A | | 10/1997 | Ter Horst |
| 6,780,217 B1 | | 8/2004 | Palmer |
| 2002/0040569 A1 | | 4/2002 | Reinhold |
| 2016/0279547 A1 | | 9/2016 | Jainek |

FOREIGN PATENT DOCUMENTS

| | | |
|---|---|---|
| EP | 0744309 A1 | 11/1996 |
| JP | S58112425 U | 8/1983 |

OTHER PUBLICATIONS

International Preliminary Report on Patentability for PCT/EP2018/074465 dated Apr. 9, 2020, 11 pages.
First Office Action for Chinese Patent Application No. 201880097404.3, dated Jan. 4, 2022, 15 pages.

\* cited by examiner

AIR FILTER HOUSING FOR AN AIR FILTER ARRANGEMENT IN A VEHICLE

This application is a 35 USC 371 national phase filing of International Application No. PCT/EP2018/074465, filed Sep. 11, 2018, the disclosure of which is incorporated herein by reference in its entirety.

TECHNICAL FIELD

The invention relates to an air filter housing for an air filter arrangement in a vehicle, in particular for filtering air intake to an internal combustion engine in a vehicle. The air filter housing is configured for receiving unfiltered air and outputting filtered air by passage of the air through an air filter unit. The air filter housing forms a filter cavity and comprises a support member being fixedly arranged in said filter cavity. The support member comprises a filter holder portion for holding said air filter unit in a use position in which the complete filter holder portion is located inside said filter cavity. Moreover, the invention relates to an air filter arrangement, a method and a vehicle.

The invention can be applied in heavy-duty vehicles, such as trucks, buses and construction equipment. Although the invention will be described with respect to a truck, the invention is not restricted to this particular vehicle, but may also be used in other vehicles such as buses and construction equipment vehicles.

BACKGROUND

An internal combustion engine receives air to combust fuel in a combustion chamber to produce power. Such an engine is provided with an intake system in order to supply air from the outside of the vehicle to the internal combustion engine.

The air intake system of a vehicle may include an air intake followed by an intake duct, for supplying air to an air cleaner arrangement. The air cleaner arrangement typically comprises an air cleaner housing in which an air filter is arranged, to filter the air from dust by passage through the air filter before reaching the internal combustion engine. Air cleaner arrangements and air filters may be designed in many different shapes and configurations. The most common solution in today's trucks is to use a cylindrical air cleaner with a cylindrical air filter.

The air filter needs to be replaced on a regular basis (from e.g. every month to every second year) to keep the air cleaning function on a desired level. The replacement of the air filter is time consuming, and may often involve work being unergonomic for the service technician.

The used air filters are disposed. Conventionally, the air filters consists of a pleated filter media that is shaped into a cylinder where the ends are casted together with a PUR (polyureathane) material to provide radial and axial seal, and which is further provided with a plastic inner cage to provide axial strength.

US 2014/0223868 discloses an air filter system having a housing and at least one detachable cover detachably connected to the housing to close off the housing. At least one exchangeable element is arranged within the housing.

As such, it would be desirable to facilitate the replacement of an air filter in an air cleaner arrangement.

SUMMARY

An object of the invention is to provide an air filter housing and/or an air filter arrangement, and/or a method which provides for facilitated replacement of the air filter, and/or for improved ergonomics during replacement.

As such, the invention relates to an air filter housing for an air filter arrangement in a vehicle, the air filter housing being configured for receiving unfiltered air and outputting filtered air by passage of the air through an air filter unit. The air filter housing forms a filter cavity configured to house the air filter unit. The filter housing comprises a support member being fixedly arranged in the filter cavity. The support member comprises a filter holder portion for holding said air filter unit in a use position, in which use position the complete filter holder portion is located inside the filter cavity.

Further, the filter holder portion is movable between an extended position and a retracted position, wherein the retracted position is said use position. In the extended position, at least a part of the filter holder portion is located outside of the filter cavity.

When the filter holder portion is moved to assume its extended position, replacement of the filter unit carried by the filter holder portion may conveniently be performed, since at least part of the filter holder portion is accessible. Once provided with a new filter unit, the filter holder portion is retracted to its use position, so that the filter unit also assumes its use position. Accordingly, replacement of the filter unit may be performed in a convenient and time-efficient manner.

By "filter holder portion" is meant a portion which is configured to hold and/or support the air filter unit, when in use. The movable filter holder portion may be a portion of a movable part, which part also comprises other portions which do not form the filter holder portion. That the filter holder portion is configured to hold and/or support the air filter unit does not exclude that other portions of the air filter housing may be in contact with the air filter unit, when in use.

The air filter unit may advantageously be an air filter unit forming a sleeve about a central axis and extending axially between a first end and a second end. The sleeve may for example be conical or cylindrical, but a cylindrical sleeve is more preferred. The air filter unit may form an outer sleeve surface for receiving unfiltered air, and an inner sleeve surface for output of filtered air. The air filter unit may comprise a pleated filter component likewise forming a sleeve.

Suitably, the filter housing comprises an outlet for filtered air. The outlet may be centrally arranged in the filter housing. In the use position, the sleeve-shaped filter unit may be arranged so as to surround said outlet, e.g. coaxially with said outlet.

The filter housing may comprise an end wall surrounding said outlet. The filter housing may comprise side walls extending from said end wall towards an open end of the filter cavity. The filter cavity may hence be defined by the end wall and the side walls. The open end of the filter cavity may be adapted for removal and insertion of a filter unit to the filter housing. The filter housing may further comprise a lid for closing the open end of the filter cavity when the air filter system is in use.

The filter cavity may be a generally cylindrical cavity for housing said air filter unit.

Hence, in use, when the air filter unit is housed within the filter cavity, the side walls will at least partly surround the air filter unit. Optionally, the side walls extend axially along at least 50% of the length of an air filter unit positioned in the filter cavity, preferably along at least 75%, most preferred at least 95% of the length of an air filter unit positioned in the filter cavity. In an embodiment, the side walls extend axially along at least the full length of the air filter unit, when in a use position in the filter cavity.

The filter holder portion is configured to hold the air filter unit. When in the use position, the side walls of the cavity will surround the filter holder portion. Optionally, the filter holder portion may be configured to hold at least an end of the air filter unit.

The filter housing may comprise an inlet for unfiltered air. The inlet may be peripherically arranged.

In the extended position, at least part of the filter holder portion is located outside of said cavity. Accordingly, the accessibility of the filter holder portion is improved when in the extended position, as compared to the retracted position, which facilitates replacement of a filter unit.

Optionally, the complete filter holder portion, when in said extended position, is located outside the cavity. This has the benefit of the entire filter holder portion being easily accessible when replacing the filter unit.

Optionally, the support member is extending along an axial direction and the filter holder portion is movable along said axial direction. The outlet of the housing may advantageously be arranged concentrically with the support member along said axial direction.

Advantageously, the filter holder portion is movable along an axis being defined as extending centrally through the outlet of the filter housing, centrally through the filter holder portion and hence coinciding with central axis of a filter unit to be carried by the filter holder portion.

Optionally, the support member comprises a first part being fixedly arranged in said filter cavity and a second part, being movably arranged to the first part, wherein the second part comprises said filter holder portion. In particular, the second part may be slidably arranged to the first part.

Naturally, the support member may in comprise more than two parts, such as a third part and/or a fourth part. The parts may be mutually movable.

Optionally, the support member may consist of two parts. This provides for easy design and manufacture.

Optionally, the second part may be telescopically arranged to the first part. With telescopically arranged is meant that the first and second parts are generally sleeve-shaped parts, being coaxially arranged so that the second part is movable along the first part. Optionally, the support member may comprise more than two parts being telescopically arranged.

Optionally, the filter holder portion is sleeve-shaped.

Optionally, the support member forms a cage structure allowing air to be filtered to pass through said cage structure, when the filter holder member is in the use position. Hence, air to be filtered may pass through the cage structure.

As mentioned in the above, the filter housing may comprise an outlet for filtered air. Optionally, the support member is arranged to surround said outlet, preferably said support member is concentrically arranged with said outlet.

Optionally, the support member comprises an outlet sealing member arranged between the filter holder portion and the outlet of the filter housing, preferably between a proximal end of the filter holder portion and the outlet of the filter housing.

Optionally, the outlet sealing member comprises an expansible and retractable member, such as bellows member. Optionally, the outlet sealing member may be sealingly arranged at a first end to the end wall of the filter cavity, so as to surround the outlet, and may at a second end be sealingly arranged to a part comprising the filter holder portion.

Optionally, the support member extends between a proximal end, fixed to the filter housing and a distal end, wherein preferably said distal end is a free end. Hence, a new filter unit may be applied to the filter holder portion of the support member by axially threading the new filter unit over the free end of the support member.

In a second aspect, the invention relates to an air filter arrangement comprising an air filter housing in accordance with the above, and an air filter unit forming a sleeve about a central axis and extending axially between a first end and a second end, the air filter unit having an outer sleeve surface for receiving unfiltered air, and an inner sleeve surface for output of filtered air, the air filter unit being removably arranged to said filter holder portion.

Optionally, the air filter unit may be removably arranged to the filter holder portion so as to be removable and attachable from an axial direction of the filter housing.

In a third aspect, the invention relates to a method for applying an air filter unit to an air filter housing as described in the above. The method comprises the steps of:
 When the filter holder portion is in said extended position, attaching said air filter unit to the holder portion; and
 Retracting the holder portion carrying the air filter unit to the use position.

Optionally, the method further comprises the following steps for replacing a used air filter unit: moving the filter holder portion carrying a used air filter unit from the use position to the extended position;
 Removing the used air filter unit from the filter holder portion; and
 Providing a new air filter unit, and applying said new air filter unit to the air filter housing by the steps described in the above.

In a fourth aspect, the invention relates to an air intake assembly for a vehicle comprising an air filter housing as described in the above or an air filter arrangement as described in the above, wherein the air filter housing is adapted to filter intake air to a combustion engine.

In a fifth aspect, the invention relates to a vehicle comprising an air filter housing as described in the above, and/or an air filter arrangement as described in the above, preferably a truck, a bus, or a construction equipment vehicle.

It will be understood that features and advantages described herein with reference to any aspect of the invention may similarly be applied to the other aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

In FIGS. 3a to 5, like reference numbers refer to similar features.

DETAILED DESCRIPTION OF EXAMPLE EMBODIMENTS OF THE INVENTION

The invention will be described below for a vehicle in the form of a truck 1 such as the truck illustrated in FIG. 1. The truck 1 should be seen as an example of a vehicle which could comprise an air supply arrangement according to the present invention and/or a separator as described herein.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 1:
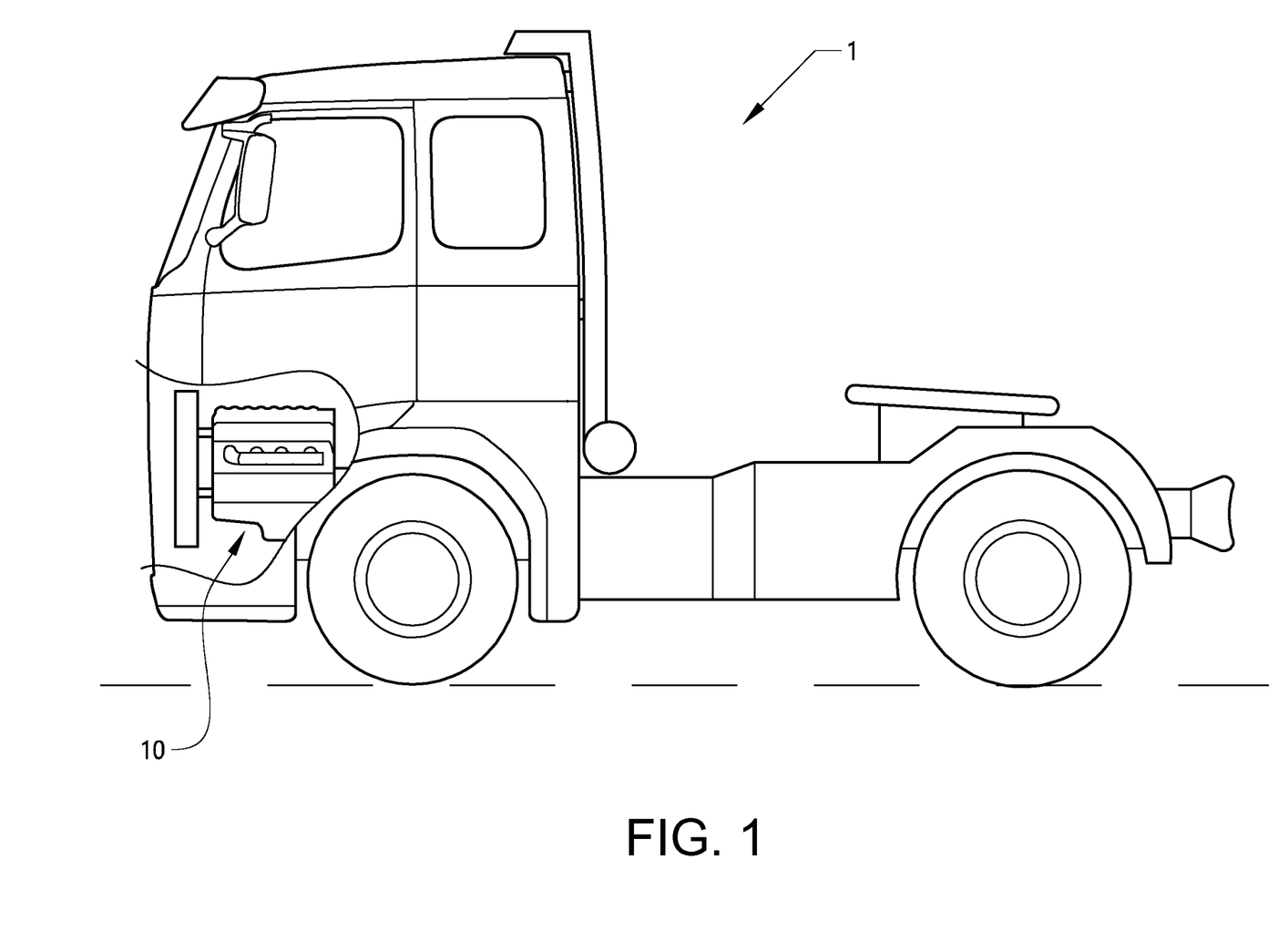
FIG. 1 is a schematic view of a vehicle.
Figure 2:
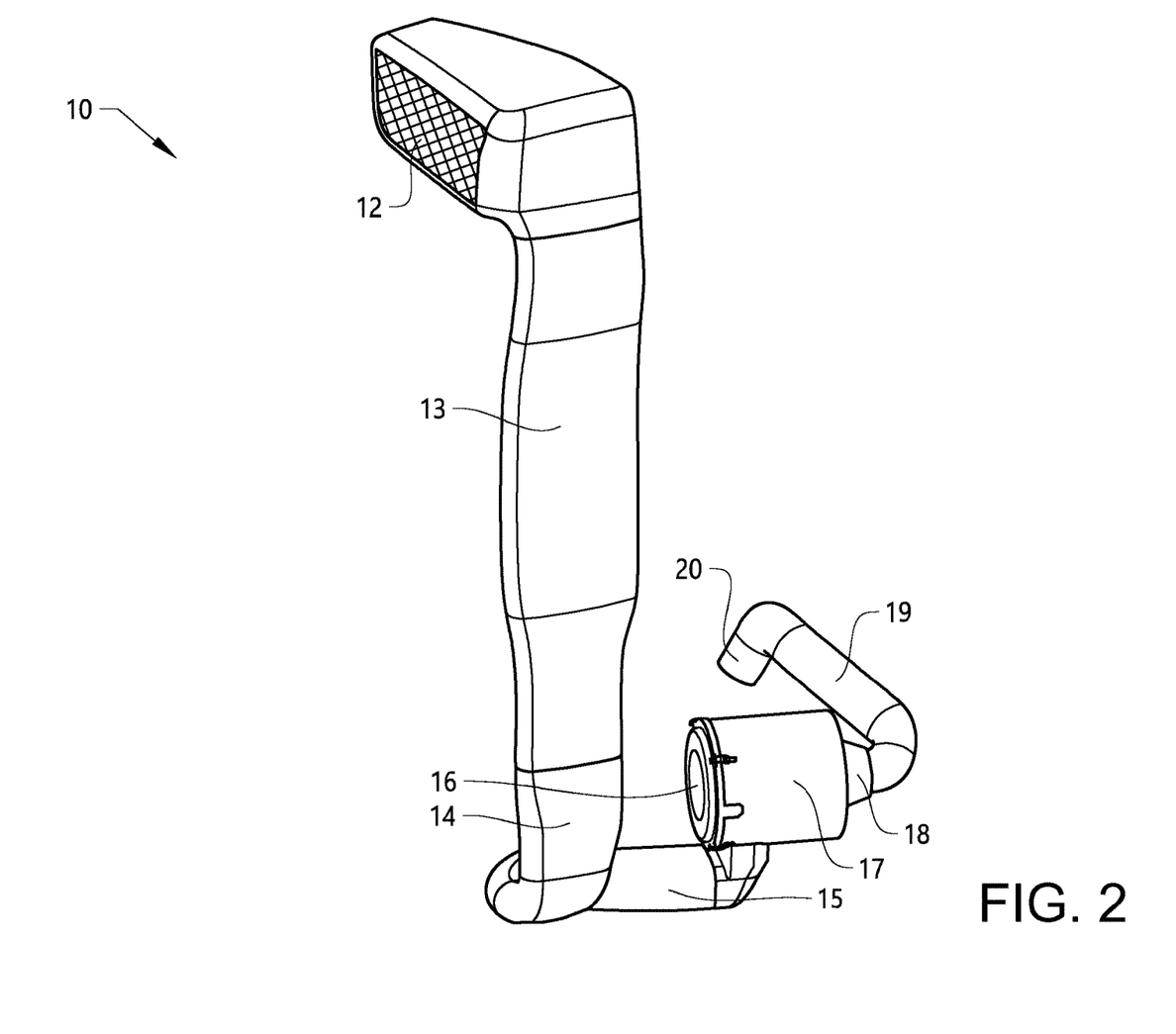
FIG. 2 is a schematic view of an air intake system.

The FIG. 1 vehicle 1 comprises an air intake system 10 as illustrated in FIG. 2. An air intake system 10 is generally arranged so as to supply air from the outside of a vehicle, e.g. from the outside of the cab, to an internal combustion engine of the vehicle.

The air intake system 10 of FIG. 2 will now be described as an example. However, it is to be understood that the present invention may be applied also in other variants of air intake systems.

The air intake system 10 of FIG. 1 comprises an air intake 12 in connection with outside air. The air intake 12 is in communication with an air duct 13 for transferring air further into the vehicle 1. The exemplified air duct 13 has an elongated shape which is arranged in a generally vertical direction (with respect to a vertical direction of the vehicle). The air duct 13 leads the air to a bellow 14, which in turn is connected to a turn chamber 15. From the turn chamber 15 the air is fed further downstream to an air cleaner, comprising an air cleaner housing 17 and an air cleaner cover 16. Inside the air cleaner housing 17, an air filter is arranged. The air cleaner cover 16 is removable from the air cleaner housing 17 so as to enable replacement of the air filter when necessary.

The air cleaner housing 17 is in connection with an air cleaner rubber bellow 18 which is in turn connected an intermediate pipe 19. Downstream the intermediate pipe 19, there is a turbo inlet, here in the form of a turbo inlet rubber bellow 20. From the turbo inlet, the air will continue downstream towards the internal combustion engine.

It is to be understood that the illustrated air intake system 10 is exemplary, and that the invention may be applied to numerous variants of air intake systems.

In the following, exemplary embodiments of the invention will be described with reference to FIGS. 3a to 5. It will be understood that the filter housing 200 described may be used in an air intake system 10 as described in relation to FIG. 2, but also in numerous other variants of air intake systems.

Figure 3A:
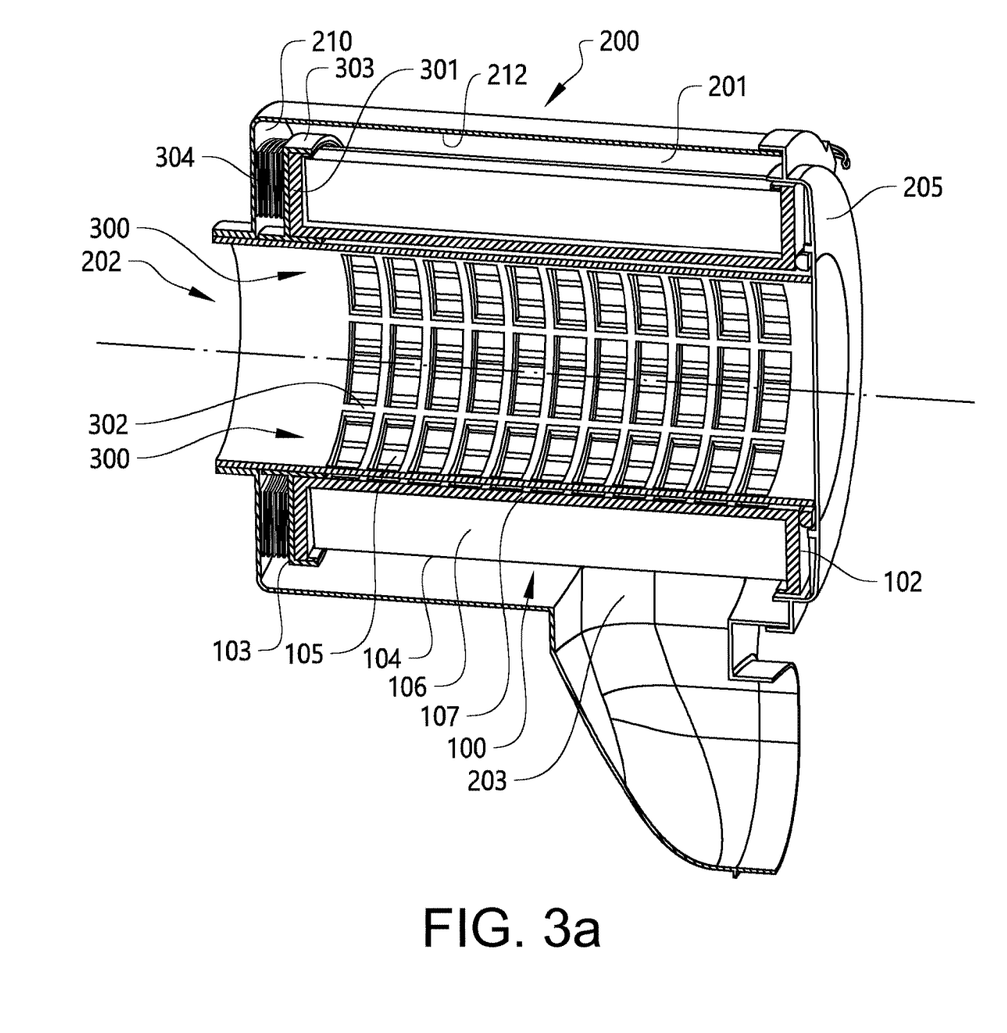
FIG. 3a is a schematic split view of an embodiment of an air filter housing with an air filter unit in a use position.

FIG. 3a is a schematic split view of a variant of a filter housing 200 for arrangement in a vehicle. The air filter housing 200 is configured for receiving unfiltered air and outputting filtered air by passage of the air through an air filter unit 100.

To this end, the air filter housing 200 forms a filter cavity 201 configured to house the air filter unit 100. The filter housing 200 comprises a support member 300 being fixedly arranged in the filter cavity 201. The support member 300 defines a filter holder portion 301 for holding the air filter unit 100 in a use position in the cavity 201.

The filter housing 200 comprises an outlet 202 for filtered air, and an inlet 203 for unfiltered air 203. In the illustrated embodiment, the outlet 202 is centrally arranged in the air filter housing 200. The inlet 203 is peripherically arranged to the filter housing 200. Via the air inlet 203 and outlet 202, the filter housing 200 and hence the air cleaner arrangement may be arranged in an air inlet system such as the one described in relation to FIG. 2.

The filter housing comprises an outlet 202 for filtered air, which outlet 202 is centrally arranged in the filter housing 202. As seen in FIG. 3a, in the use position, the sleeve-shaped filter unit 100 is arranged so as to surround said outlet 202, that is, coaxially with said outlet 100.

The air filter unit 100 is adapted for filtering air intake to an internal combustion engine in a vehicle. The air filter unit 100 forms a cylindrical sleeve about a central axis (X) and extends axially between a first end 102 and a second end 103. The air filter unit 100 forms an outer sleeve surface 104 for receiving unfiltered air, and an inner sleeve surface 105 for output of filtered air, when the filter unit 100 is in use in an air cleaner arrangement such as for example the arrangement described with reference to FIG. 2.

In the illustrated embodiment, the air filter unit 100 comprises a pleated filter component 106 and a cage structure 107, arranged at the pleated filter component 106. The pleats of the pleated filter component extend generally axially.

The first end 102 and the second end 103 of the air filter unit comprise, in this embodiment, first and second end surfaces, respectively, which end surfaces seal the pleated filter component 106 in axial directions. The end surfaces are annular, and connected by the axially extending, sleeve-shaped cage structure 107.

The cage structure 107 is formed so as to allow air to pass through the filter unit 100 from the outer sleeve surface 104 to the inner sleeve surface 105. It will be understood that numerous variants of the filter unit 100 for use with the filter housing described herein are possible.

Advantageously, the filter unit 100 may be disposable, hence, it is adapted to be used once and then to be discarded.

In FIG. 3a, the filter cavity 201 is a generally cylindrical cavity. The filter housing 200 comprises an end wall 210, surrounding the outlet 202 for filtered air. The filter housing comprises side walls 212 extending from the end wall 210 towards an open end 214. The filter cavity 201 is hence defined by the end wall 210 and the side walls 212. The open end 214 is adapted for axial removal and insertion of the filter unit 100 in the filter cavity 201.

The filter housing 200 further comprises a lid 205 for closing the open end 214 of the filter cavity 201 when the air filter arrangement is in use.

As seen in FIG. 3a, when in use, air to be filtered is introduced via the peripherically arranged inlet 203, into the cavity 201, where it reaches the outer sleeve surface 104 of the filter unit 100. The air will pass radially through the sleeve-shaped filter unit 100, such that filtered air will reach the outlet 202. As is conventional in the art, the air filter arrangement may be provided with suitable seals, such as O-rings, for ensuring that the air follows the intended flow path through the air filter arrangement.

In FIG. 3a, illustrating a use position, the complete filter holder portion 301 is located inside filter cavity 201. In other words, the side walls 212 extend axially along at least the full length of the filter holder portion 301.

In the embodiment of FIG. 3a, the complete filter holder portion 301 is located inside filter cavity 201, i.e. the complete filter holder portion 301 is completely surrounded by the side walls 212. Also, in the embodiment of FIG. 3a, the complete air filter unit 100 is located in the filter cavity 201 when in the use position. This is an advantageous embodiment, where the air filter housing 200 may be conveniently closed by a relatively flat lid 205. However, embodiments may be conceived where the side walls 212 extend along only part of the axial length of the air filter unit 100.

However, for the present invention, it is preferred if the side walls extend axially along at least 50% of the length of the air filter unit 100, preferably along at least 75%, most preferred at least 95% of the air filter unit 100, when in the use position.

Figure 3B:
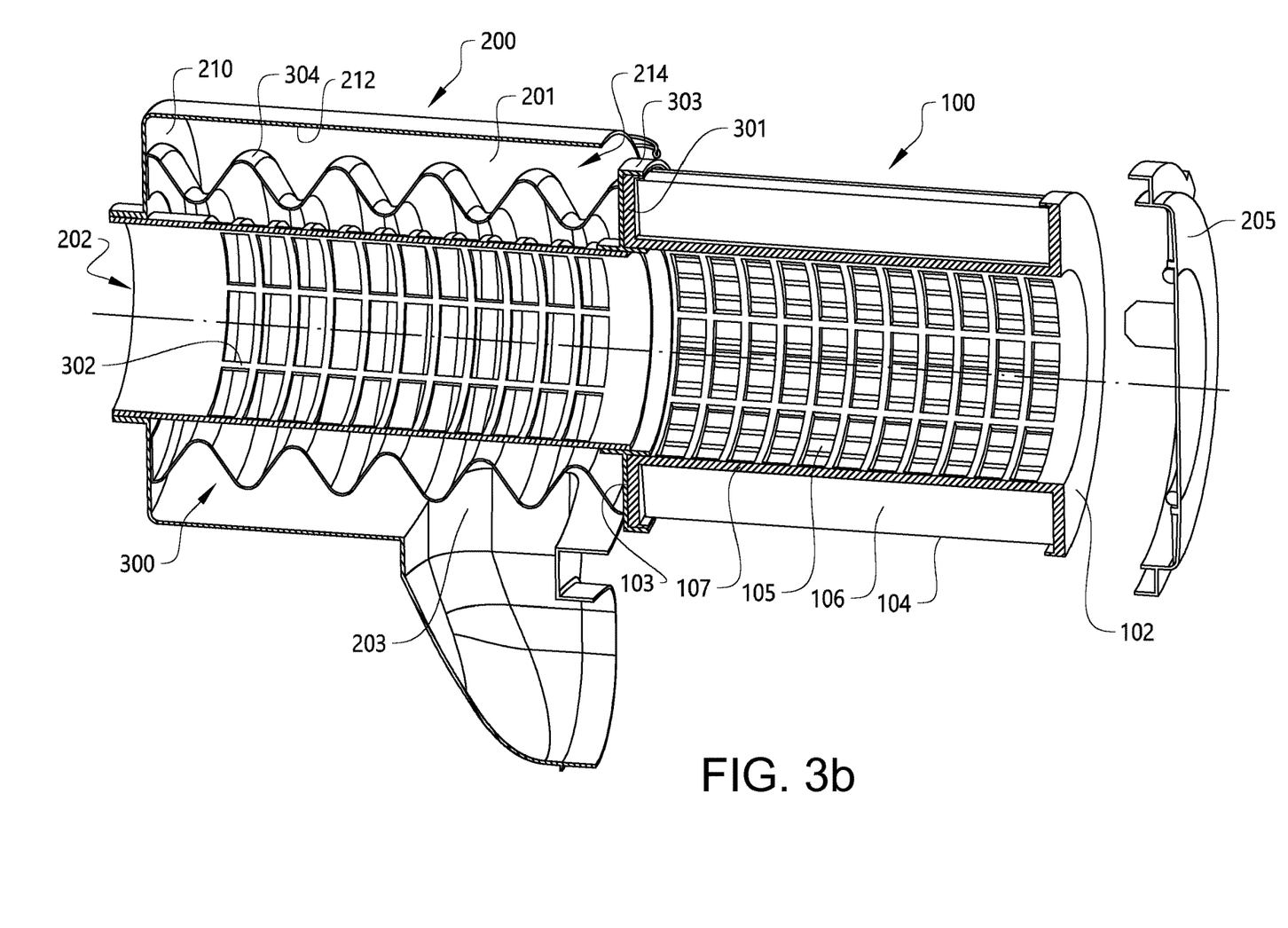
FIG. 3b is a schematic split view of the air filter housing with air filter unit of FIG. 3a, but in an extended position.

FIG. 3b illustrates the arrangement of FIG. 3a, but when the filter holder portion 301 is in an extended position. To assume this position, the lid 205 is first removed from the filter housing, exposing the opening 214 into the filter cavity 201. Then, the filter holder 301 with the filter unit 100 may be moved axially until the filter holder 301 is in the extended position of FIG. 3b.

As seen in FIG. 3b, in the extended position, the filter unit 100 held by the filter holder portion 301 protrudes from the filter cavity 201. In the illustrated embodiment, the complete filter holder portion 301 is located outside of the filter cavity 201 in the extended position.

Hence, the filter unit 100 may easily be detached from and/or attached to the filter holder portion 301.

However, variants are possible in which only part of the filter holder portion 301 is located outside the filter cavity 201 in the extended position.

The support member 300 may comprise a first part 302 being fixedly arranged in the filter cavity 201. In FIG. 3b, the first part 302 is a sleeve shaped cage structure, extending from the end wall 210 of the cavity 201 towards the open end 214 of the filter cavity 201.

Further, the support member 300 may comprise a second part 303, being movably arranged to the first part 302. In FIG. 3b, the second part 303 is a slidable member arranged around a periphery of the first part 302. The second part 303 comprises the filter holder portion 301. The filter holder portion 301 is defined as a portion configured to contact the filter unit 100 when in use. Hence, in the embodiment of FIGS. 3a and 3b, the filter holder portion 301 generally comprises the distal facing portion of the second part 303 (distal being the direction towards the open end 214 of the filter cavity 201).

The first part 302 and the second part 303 are telescopically arranged, as described in the above. That is, the first and second parts 302, 303 are two concentrically arranged, sleeve-shaped parts, where the second part 303 is movable in relation to the first part 302.

As seen in FIG. 3b, the filter holder portion 301 may form a coupling for holding the first or second end 102, 103 of the filter unit 100. In FIG. 3b, the filter holder portion 301 forms a bayonet coupling for press-fit arrangement of the filter unit 100 in the filter holder portion 301. Naturally, other suitable couplings may be envisaged.

The filter holder portion 301 should be configured for releasably holding the air filter unit 100, so as to enable replacement of the air filter unit 100 when desired. The air filter unit 100 may be attachable and removable to the filter holder portion 301 by attachment/removal in an axial direction of the filter housing 200.

In the variant illustrated in FIGS. 3a and 3b, the filter holder portion 301 substantially comprises an arrangement for holding an end 102, 103 of the filter unit 100. Alternatively, or in addition to the arrangement for holding an end 102, 103 of the filter unit 100, the filter holder portion 301 may comprise an arrangement for supporting the inner sleeve surface 105 of the air filter unit 100. To this end, the filter holder portion 301 may form a sleeve-shaped structure adapted to extend inside an air filter unit 100 applied thereto. Such a sleeve-shaped structure may extend along at least 25% of an axial length of the filter unit 100, or along at least 50% of an axial length of the filter unit 100, or along at least 100% of an axial length of the filter unit 100. In some variants, the filter holder portion 301 may comprise a sleeve-shaped structure extending along substantially the entire axial length of the filter unit 100.

As seen in relation to the inner wall 212 of the filter housing 200, it may be envisaged that such a sleeve-shaped structure may extend along at least 25% of an axial length of the inner wall 212, or along at least 50% of an axial length of the inner wall 212, or along at least 100% of an axial length of the inner wall 212. In some variants, the filter holder portion 301 may comprise a sleeve-shaped structure extending along substantially the entire axial length of the inner wall 212.

The sleeve-shaped structure may form a cage structure similar to the first part 302 of the support structure 300 of the illustrated variants.

The first part 302 and the second part 303 may advantageously comprise corresponding guiding means, for example in the form of corresponding grooves and protrusions, for guiding the movement of the second part 303 along the first part 302.

The support member 300 may comprise an outlet sealing member 304 arranged between the filter holder portion 301 and the outlet 202 of the filter housing 200.

In FIGS. 3a and 3b, the outlet sealing member 304 forms a rectractible and expandable bellows. In FIG. 3a the outlet sealing member 304 is seen in a retracted position, wherein the bellows is folded to be located in a space between the filter holder portion 301 (the second part 303) and the end wall 210 of the filter housing. In FIG. 3b, the outlet sealing member 304 is seen in an expanded position, where the outlet sealing member 304 extends over a distance between the end wall 210 of the filter housing 200 and the filter holder portion 301, which is in its extended position. The outlet sealing member 304 is sealingly attached to the end wall 210 of the filter housing, surrounding the outlet 202, and is likewise sealingly attached to the second portion 303 comprising the filter holder portion 301.

In the extended position, the outlet sealing member 304 extends over the part of the support member 300 which is located between the end wall 210, including the outlet 202, and the filter holder portion 301. Hence, the outlet sealing member 304 hinders any debris from the part of the filter cavity 201 being accessible for unfiltered air, to enter the outlet 202.

Figure 4:
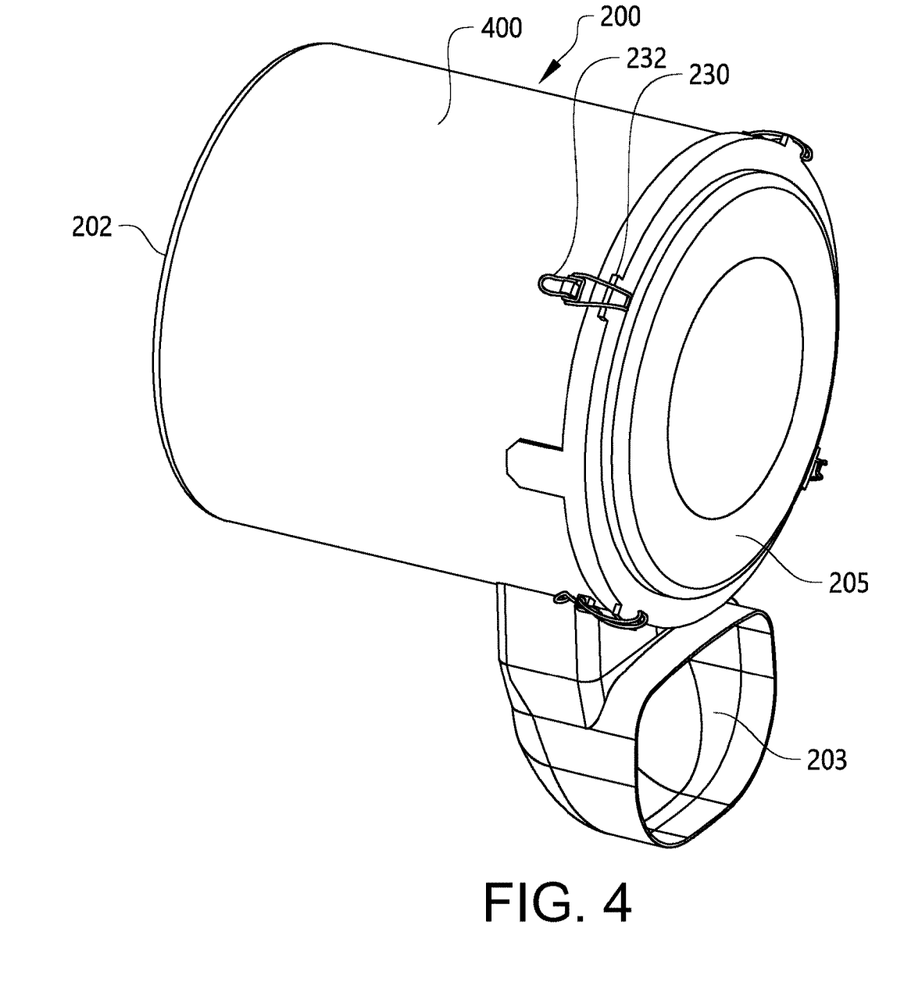
FIG. 4 is a schematic perspective view of the embodiment of an air filter housing with an air filter unit of FIGS. 3a and 3b.

FIG. 4 is a perspective view of the air filter housing 200 of FIGS. 3a and 3b, when the air filter holder 301 is in the use position of FIG. 3a, and the lid 205 is arranged over the opening 214 of the air filter cavity 201. The lid 205 may be fastened to an outer periphery of the air filter cavity by any conventional lid fastening means. In FIG. 4, the lid 205 is fastened by hooks 230 of the lid engaging with snap-locks 232 of the air filter cavity 201.

Figure 5:
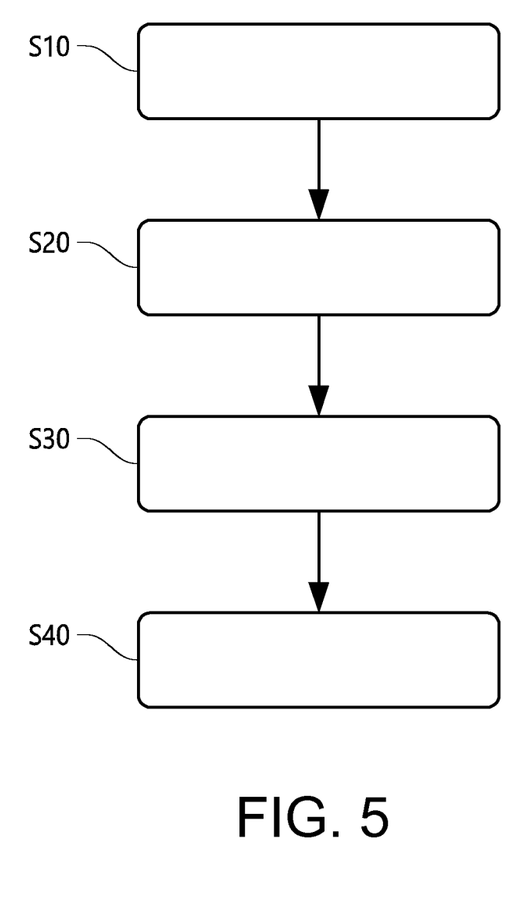
FIG. 5 illustrates an embodiment of a method for replacing an air filter unit.

FIG. 5 illustrates schematically a method for applying an air filter unit 100 to an air filter housing 200 as described in the above. The method comprises a step S30 of attaching said air filter unit 100 to the holder portion 301 of the support member 300 when the holder portion 301 is in the extended position, and a following step S40 of retracting the holder portion 301 carrying the air filter unit 100 to assume the use position.

Further, for replacing a used air filter unit 100, the method may comprise the step S10 of moving the filter holder portion 301 carrying a used air filter unit 100 from the use position to the extended position, and the step S20 of removing the used air filter unit 100 from the filter holder portion. Then, a new air filter unit 100 may be provided, and arranged in the filter housing by steps S30 and S40 as described in the above.

Once the air filter unit 100 is positioned inside the filter housing 200, the filter cavity 201 may be closed, e.g. by attachment of a lid 205 closing the filter cavity opening 214.

It will be understood that the method may be applied to the air filter housing 200 as described in relation to FIGS. 3a to 4, but also for other variants of air filter housings 200 as disclosed herein.

Although the air filter housing 200 is described with an air filter unit 100 as illustrated in FIGS. 3a and 3b, it will be understood that the air filter housing 200 may be configured for other variants of air filter units 100. For example, the air filter unit 100 may be conical. Moreover, the function of some elements being parts of the air filter unit 100 as illustrated, such as the end walls 102, 103 and/or the cage structure 107, may instead be performed by parts of the air filter housing 200. For example, the lid 205 of the air filter housing 200 may be configured to perform the sealing of the end of the pleated filter 106, i.e. to perform the function of the end wall 102 in FIG. 3b. Also, the filter holder portion 301 may form a sleeve-shaped cage structure adapted to extend inside an air filter unit 100 applied thereto. In some such variants, the cage structure 107 of the air filter unit 100 may be dispensed with, since the filter holder portion 301 may support the air filter unit 100 radially and along an axial direction, so as to assist in maintaining the sleeve-shape of the filter unit 100.

It is to be understood that the present invention is not limited to the embodiments described above and illustrated in the drawings; rather, the skilled person will recognize that many changes and modifications may be made within the scope of the appended claims.

The invention claimed is:

1. An air filter housing for an air filter arrangement in a vehicle, comprising:
   an air filter housing forming a filter cavity configured to house an air filter unit, the air filter housing configured to receive unfiltered air and output filtered air by passage through the air filter unit, the air filter housing comprising:
      an outlet for filtered air;
      a support member fixedly arranged in the filter cavity, the support member comprising a filter holder portion for holding the air filter unit in a retracted position comprising an entirety of the filter holder portion is inside the filter cavity, the support member comprising an outlet sealing member arranged between the filter holder portion and the outlet of the filter housing, the outlet sealing member being an expansible and retractable member; and
      the filter holder portion movable between the retracted position and an extended position comprising at least a part of the filter holder portion is outside of the filter cavity.

2. The air filter housing of claim 1 wherein in the extended position, an entirety of the filter holder portion is located outside of the cavity.

3. The air filter housing of claim 1, wherein the support member extends along an axial direction and the filter holder portion is movable along the axial direction.

4. The air filter housing of claim 1, wherein the support member comprises a first part fixedly arranged in the filter cavity and a second part movably arranged to the first part, wherein the second part comprises the filter holder portion.

5. The air filter housing of claim 4, wherein the second part is telescopically arranged to the first part.

6. The air filter housing of claim 1, wherein the filter holder portion is configured for holding at least an end of the air filter unit.

7. The air filter housing of claim 1, wherein the support member defines a cage structure allowing air to be filtered to pass through the cage structure when the air filter is in use the retracted position.

8. The air filter housing of claim 1, wherein the support member is arranged to surround the outlet.

9. The air filter housing of claim 1, wherein the outlet sealing member is arranged between a proximal end of the filter holder portion and the outlet of the filter housing.

10. The air filter housing of claim 1, wherein the filter housing forms an open end for introduction and/or removal of an air filter unit relative to the filter cavity.

11. The air filter housing of claim 10, further comprising a lid adapted to close the open end.

12. The air filter housing of claim 1, wherein the support member extends between a proximal end, fixedly arranged in the filter cavity and a distal end.

13. An air filter arrangement comprising an air filter housing according to claim 1, and an air filter unit forming a sleeve about a central axis and extending axially between a first end and a second end, the air filter unit having an outer sleeve surface for receiving unfiltered air, and an inner sleeve surface for output of filtered air, the air filter unit being removably arranged to the filter holder portion.

14. A method, comprising:
   attaching an air filter unit to an filter holder portion of a support member when the air filter unit is in an extended position in which at least a part of the filter holder portion is outside a filter cavity defined by an air filter housing, the air filter housing configured to receive unfiltered air and output filtered air by passage through the air filter unit, the air filter housing comprising an outlet for filtered air; and
   moving the filter holder portion carrying the air filter unit from the extended position to a retracted position in which an entirety of the filter holder portion is inside the filter cavity, the support member comprising an outlet sealing member arranged between the filter holder portion and the outlet of the filter housing, the outlet sealing member being an expansible and retractable member.

15. The method of claim 14, further comprising:
   moving the filter holder portion carrying a used air filter unit from the retracted position to the extended position;
   removing the used air filter unit from the filter holder portion; and
   providing a new air filter unit, and applying the new air filter unit to the air filter housing.

* * * * *